No. 728,453. PATENTED MAY 19, 1903.
C. D. B. FISK & W. W. C. SPENCER.
ELEVATOR GUARD.
APPLICATION FILED FEB. 7, 1903.
NO MODEL.
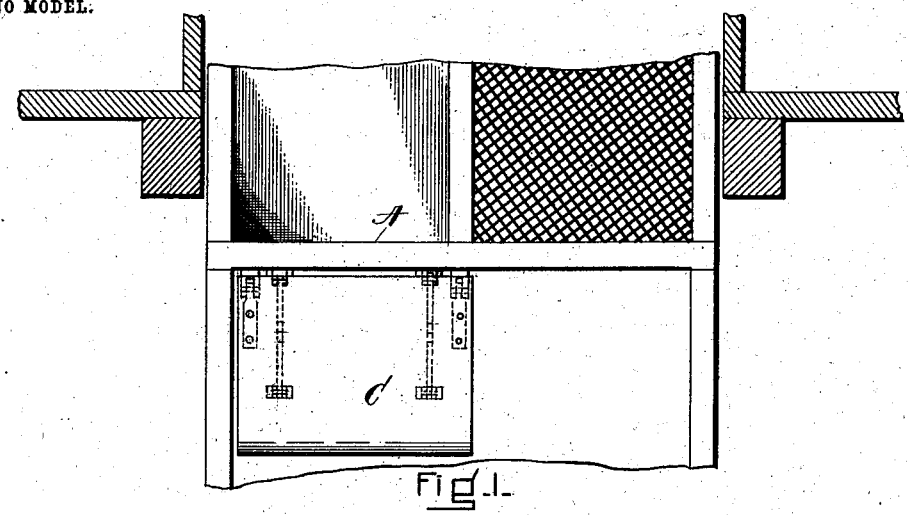
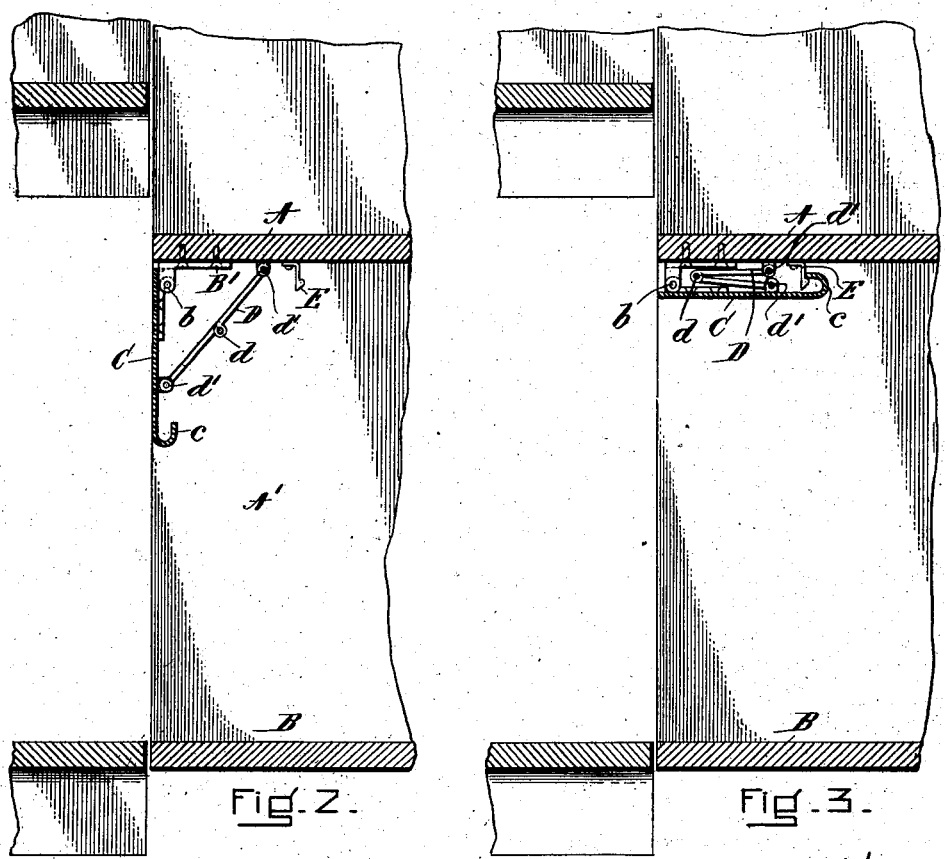
WITNESSES:
INVENTORS No. 728,453. Patented May 19, 1903.

UNITED STATES PATENT OFFICE.

CHARLES D. B. FISK AND WILLIAM W. C. SPENCER, OF BOSTON, MASSACHUSETTS, ASSIGNORS TO SPENCER ELEVATOR SAFETY GUARD COMPANY, OF PORTLAND, MAINE, A CORPORATION OF MAINE.

ELEVATOR-GUARD.

SPECIFICATION forming part of Letters Patent No. 728,453, dated May 19, 1903.

Application filed February 7, 1903. Serial No. 142,430. (No model.)

*To all whom it may concern:*

Be it known that we, CHARLES D. B. FISK and WILLIAM W. C. SPENCER, of Boston, county of Suffolk, and State of Massachusetts, have invented a new and useful Improvement in Elevator-Guards, of which the following is a specification.

An elevator-guard such as is described in Letters Patent No. 648,309, dated April 24, 1900, and granted to W. W. C. Spencer has been found exceedingly useful in preventing accidents due to a person's foot being caught under a descending elevator-car. Where, however, elevators are made in two "stories," so to speak, the passenger elevator-car being above and the freight elevator-car being below, as is the case, for example, in large warehouses, hotels, and other places where passengers and freight are being continually carried, as the freight elevator-car is often quite low—say less than six feet—the guard when hanging down into the freight elevator-car takes up considerable space, and it has therefore proved very inconvenient to the handling of freight.

Our present invention relates to a guard which has none of the objections referred to, for the reason that it is hinged in such a way that while it is a firm and steady guard when a guard is required it can be swung up out of the way and fastened, so that it will not interfere with persons loading the freight elevator-car.

Our invention will be understood by reference to the drawings, in which there is shown such a guard constructed in the way which now seems to us best.

Figure 1 is a front elevation of the elevator car and guard, the well and floor being in section. Fig. 2 is a similar view in vertical section; and Fig. 3 is a view like Fig. 2, the guard, however, being folded out of the way.

A is the floor of the passenger elevator-car, B being the floor of the freight elevator-car, the two being connected in the usual manner by walls A'. To the under side of the floor of the passenger elevator-car is screwed or otherwise attached a plate B', having hinges $b$ attached thereto, and to these hinges is attached the guard C, which extends downward toward the floor of the freight elevator-car.

D is a brace jointed at $d$ with a knuckle-joint, one end of said brace being hinged by a suitable hinge at $d'$ to the under side of the floor A of the passenger elevator-car, the other end being similarly hinged to the guard. A number of these braces are used, depending upon the width of the guard.

E is a hook adapted to catch under the turned-up edge $c$ of the guard C. This hook is constructed to spring slightly, so that the guard may be easily swung up and hooked in place, and at the same time may be easily pulled down when the freight elevator-car has been loaded.

As shown in Fig. 2, the guard is in its ordinary position adapted to serve its purpose in preventing a person from getting his foot under the elevator-car. The freight elevator-car in that position has reached one of the floors, and if it is to be loaded with freight the guard is swung up and hooked out of the way of the man handling the freight, as shown in Fig. 3. When the elevator-car has been loaded, the guard is unhooked and swings down and the knuckle-joint then sprung, so as to form a firm brace to hold the guard in its normal position. This construction is the simplest and most effective now known to us; but it is evident that other means may be provided for holding the guard in its two positions and allowing it to be changed from one to the other, the main novelty of our guard being that it is hinged so that it may be turned from a downward position up out of the way and will be held positively in either position.

We have shown the guard when in a downward position at substantially right angles to the floor of the elevator-car and in its upward position nearly parallel thereto. The drawings in these respects are merely suggestions, however. When in its downward position, the guard should be effective to prevent the kind of accident referred to and when in its upward position should be swung out of the way, so as to clear the head of the freight-handler, and the exact angle of the guard in either position is immaterial.

It will be noted that the guard above described is shown hinged to the floor of the passenger elevator-car, the hinges being as close to the under side of the floor as is practicable, so that when the guard is swung up out of the way it will take up as little room as possible, and in order that it may fulfil its purpose means may be provided to keep it in its horizontal position when required.

What we claim as our invention is—

1. The elevator-guard above described consisting of a plate of metal or the like having means whereby it may be hinged by its upper edge to the floor of an elevator-car, and means for positively maintaining it when so hinged in a vertical position with relation to said floor when desired, as described.

2. In combination with an elevator-car, the elevator-guard above described consisting of one piece of sheet metal or the like and means whereby it may be hinged by its upper edge to the front edge of the floor of said car, and means for maintaining it in either a depending or upward position, as described.

3. In combination with an elevator-car comprising two floors one above the other, a guard and means whereby it is hung to the upper floor to depend therefrom and to be swung up out of the way when it is desired to load the lower floor, and means for holding it in a depending position to serve as a guard, and means for holding it in a horizontal position whereby it may give sufficient clearance while the lower floor of said elevator-car is loading, as set forth.

In testimony whereof we hereunto set our names this 3d day of February, 1903.

CHARLES D. B. FISK.
WILLIAM W. C. SPENCER.

Witnesses to C. D. B. F.:
  WILLIAM F. FISK,
  SUSAN E. FISK.
Witnesses to W. W. C. S.:
  GEORGE O. G. COALE,
  M. E. FLAHERTY.